C. T. CARSON.
SLIMER.
APPLICATION FILED APR. 12, 1915.

1,175,601.

Patented Mar. 14, 1916.
4 SHEETS—SHEET 2.

WITNESSES:
O. Johnson
Frank Warren

INVENTOR
Charles T. Carson
BY
C. D. Haskins
ATTORNEY

C. T. CARSON.
SLIMER.
APPLICATION FILED APR. 12, 1915.

1,175,601.

Patented Mar. 14, 1916.
4 SHEETS—SHEET 3.

WITNESSES:
O. Johnson
Frank Warren

INVENTOR
Charles T. Carson
BY
C. D. Haskins
ATTORNEY

THE COLUMBIA PLANOGRAPH CO., WASHINGTON, D. C.

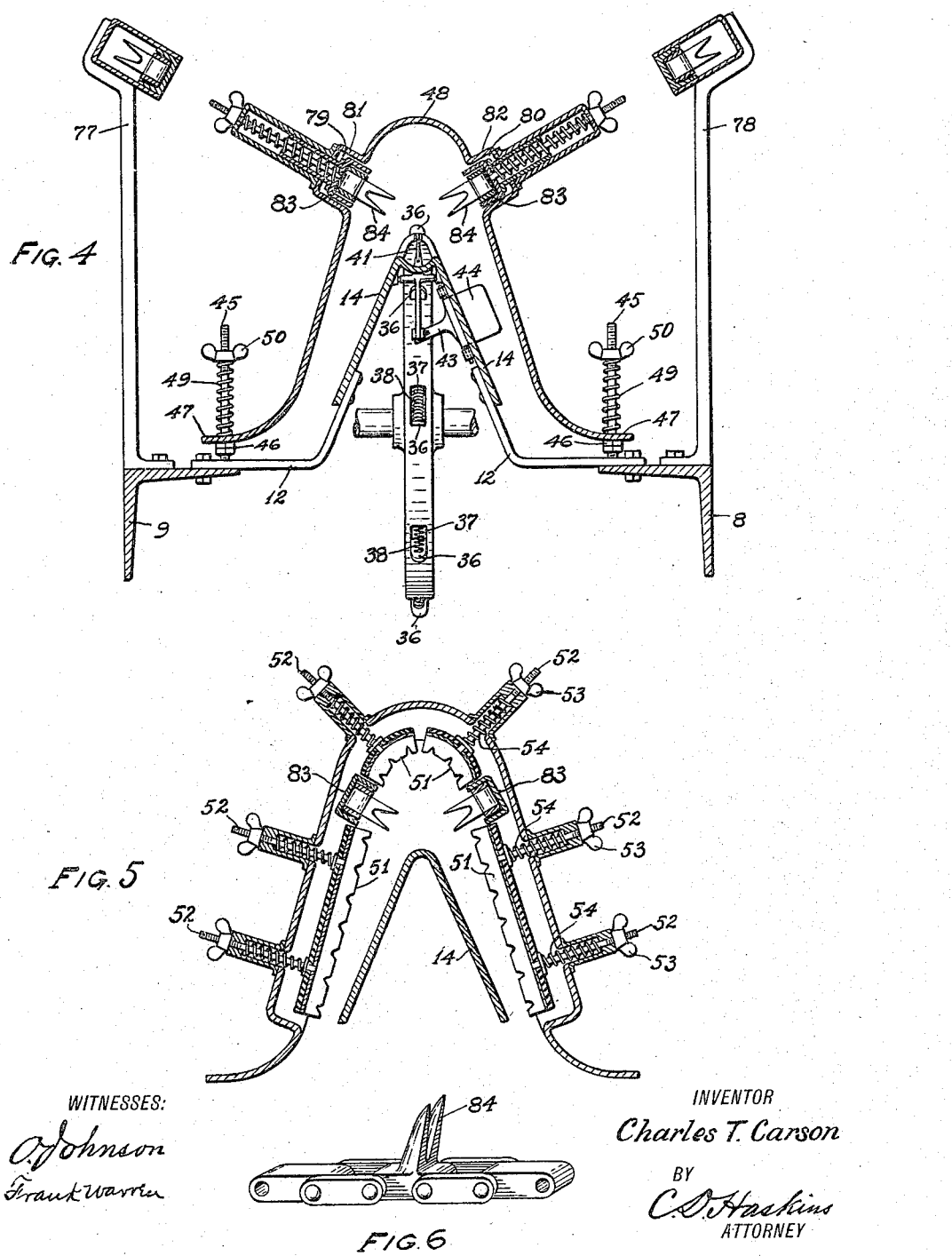

UNITED STATES PATENT OFFICE.

CHARLES T. CARSON, OF SEATTLE, WASHINGTON.

SLIMER.

1,175,601.   Specification of Letters Patent.   Patented Mar. 14, 1916.

Application filed April 12, 1915. Serial No. 20,674.

*To all whom it may concern:*

Be it known that I, CHARLES T. CARSON, citizen of the United States, residing at Seattle, in the county of King and State of Washington, have invented a certain new and useful Improvement in Slimers, of which the following is a specification.

My invention relates to improvements in machines which, in salmon canning industry, are referred to as fish-slimers, and which are employed in fish canneries for scaling and cleaning fish; and the object of my improvements is to provide a fish-slimer which shall be adapted to be operated by motive power thoroughly and rapidly to clean fish, and which shall embody means for conveying through it one fish after another to subject such fish successively to the action of different operative parts which serve to clean and scale them, thus to save manual labor in the work of preparing such fish for the operation of canning them.

I attain such object by devices illustrated in the accompanying drawings wherein—

Figure 1:
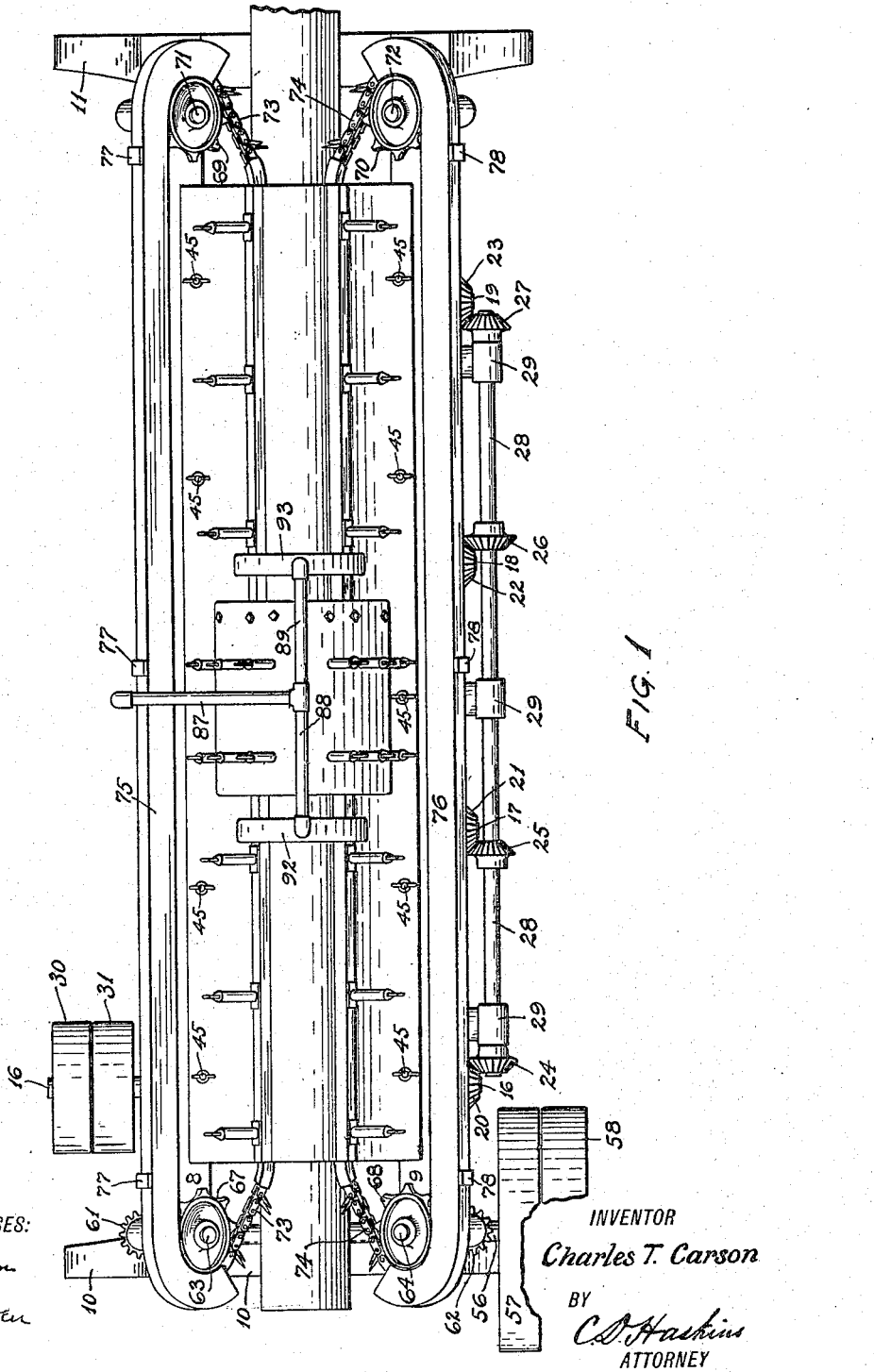
Figure 2:
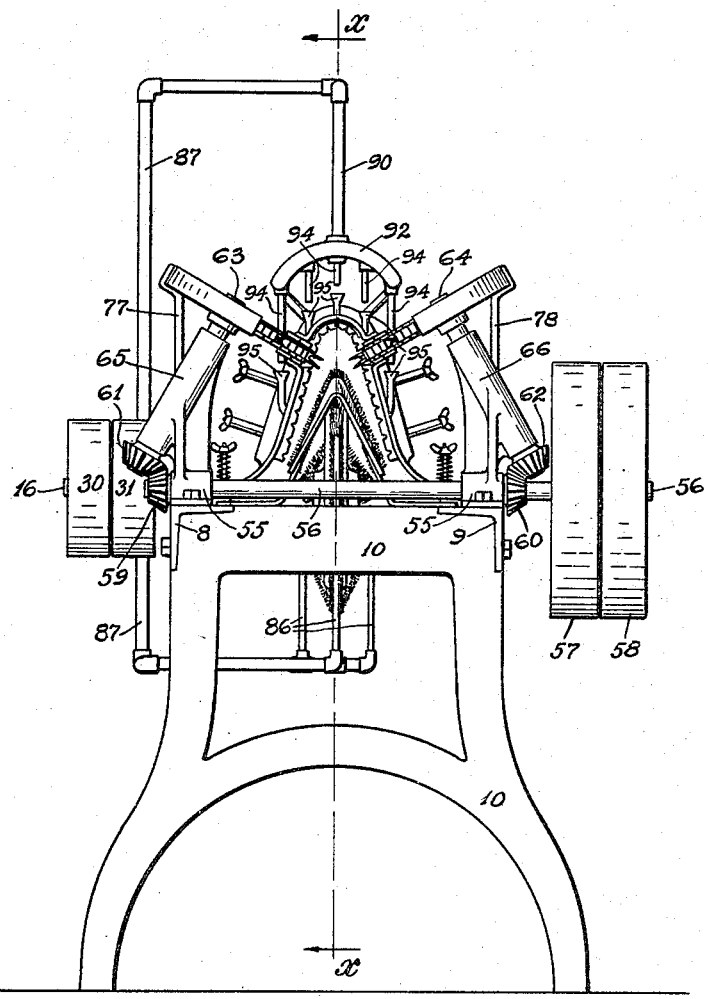
Figure 3:
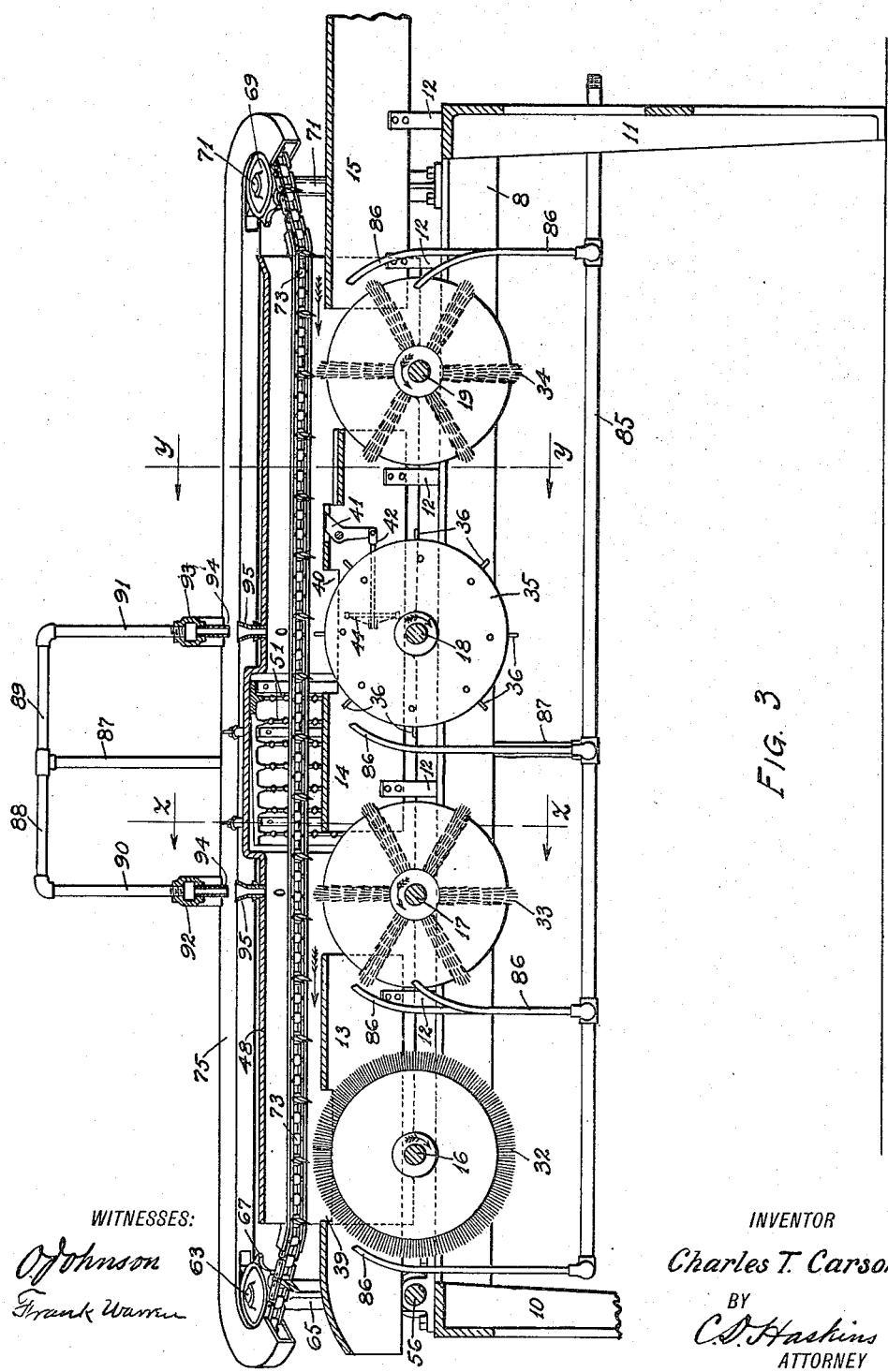

Figure 1 is a plan view of a fish-slimer embodying my invention; Fig. 2 is a view of the same in end elevation showing the delivery end thereof; Fig. 3 is a view of the same in vertical mid-section on broken line $x$, $x$ of Fig. 2, showing some internal parts in side elevation; Fig. 4 is a view of some associated parts of the same in vertical cross-section on broken line $y$, $y$ of Fig. 3; Fig. 5 is a view of other associated parts of the same in vertical cross-section on broken line $z$, $z$ of Fig. 3; and Fig. 6 is a view in perspective of parts of the same.

Referring to the drawings, throughout which like reference numerals indicate like parts, side rails 8 and 9, of angle iron, are disposed parallel with each other and mounted securely on vertical end supports 10 and 11 to extend therebetween to form a supporting frame.

Mounted on transversely disposed brackets 12, which are fastened to the side rails 8 and 9, are three sections 13, 14 and 15 of a guiding support for fish having a cross-section of the form of an inverted V which guiding support is disposed to extend in a lengthwise direction parallel with the rails 8 and 9 to project above the plane of the top surfaces of said side rails 8 and 9, as more clearly indicated in Fig. 4, and upon which guiding support as thus disposed one fish after another may be placed to be guided and supported thereby as they are moved by suitable mechanism from one end to the other of the machine, in the direction indicated by the arrows in Fig. 3, such fish having had their heads cut off, their bellies cut open lengthwise and their intestines removed to adapt them to be placed astride of said guiding support with their backs uppermost, whereby, during each movement they may be cleaned by associated devices hereinafter described.

Rotatably mounted in suitable bearings secured to the top surfaces of the side rails 8 and 9 are four transversely disposed shafts 16, 17, 18 and 19 one end portion of each of which projects outwardly from the side of the structure and on each of such outwardly projecting portions is mounted a bevel gearwheel, as bevel gearwheels 20, 21, 22 and 23, which engage respectively with bevel gearwheels 24, 25, 26 and 27 all of which are mounted securely on a shaft 28 which is rotatably mounted in bearings 29 which are secured to the side of the side rail 8 and whereby said shaft 28 is disposed in parallel with said side rail 8 and whereby all of said shafts 16, 17, 18 and 19 may rotate synchronously in the directions indicated by the several arrows, respectively, in Fig. 3, in response to rotation of said shaft 28. The other end portion of the shaft 16 projects outwardly from the side rail 9 on the other side of the structure and on such end portion is a loosely mounted pulley 30 and a securely mounted pulley 31, as more clearly shown in Fig. 1, upon which pulleys 30 and 31 may be disposed a belt, not shown, which may lead to a pulley of a power driven machine, such belt being adapted, in a well known manner, to be shifted to communicate rotary motion to a desired one of said pulleys 30 and 31, thereby to start and stop the rotation of the shaft 28.

Mounted securely on each of the shafts 16, 17 and 19, in a vertical plane midway between the side rails 8 and 9 is a circular brush, as circular brushes 32, 33 and 34, respectively, and likewise mounted on the shaft 18 is a scraper wheel 35 which is provided with a plurality of scrapers 36 which are hinged within recesses 37 formed in the periphery of said wheel 35, there being provided a helical spring 38 disposed behind each of said scrapers 36 within each of the recesses 37 whereby said scrapers 36 may yield in its engagement with the inside of a fish as said fish is moved along said fish guiding support, there being provided an opening 40 through the top of the section 14 of the guiding support through which said scrapers 36 may project in the course of their revolutions with the scraper wheel 35. There is also provided an opening 39 through the top of the section 13 through which the bristles of the circular brush 32 may project to engage with the inside surface of a fish; and bristles of each of the circular brushes 33 and 34 project upwardly through the respective spaces between sections 13 and 14 and between sections 14 and 15, as more clearly shown in Fig. 3; thus if the fish be placed astride of section 15 of the fish guiding support and then moved along such support over sections 14 and 13 successively to the delivery end of the structure then, in such case, the inner sides of each of such fish will first be subjected to the action of circular brush 34, then to the scrapers 36, then to the brush 33 and then to the brush 32.

Within the top portion of the space under section 14 of the fish guiding support, at a point near the opening 40 therein, is a pivotally mounted cutter 41 whose cutting blade may be projected upwardly through the top portion of said section 14 in response to a movement of a connecting rod 42 one end of which is articulated with the lower end portion of said cutter 41 and whose other end is articulated with the arm 43 which is attached to a pivotally mounted plate 44 that extends outwardly through an opening in one of the side walls of the section 14 of the guiding support at a right angle thereto, whereby it may be swung by engaging with a passing fish to cause the connecting rod 42 to actuate said cutter 41 to swing upwardly to cut the belly portion of said fish for a greater distance toward its tail.

Fixed to extend upwardly at equi-distant points along each of the inner edge portions of the side rails 8 and 9 are a plurality of screw-threaded studs 45, which studs 45 are each provided with a shoulder 46 on its lower end portion adjacent to its supporting side rails 8 and 9 and upon opposite ones of such shoulders 46 normally rests the respective one of the oppositely disposed flanged lower edge portions 47 of a sheet metal hood 48 which straddles the fish guiding support 14 and whose form in cross-section, as more clearly indicated in Fig. 4, adapts it to engage with the round back and a portion of the sides of a fish disposed astride of the fish guiding support 14, the space between said hood 48 and guiding support 14 being adapted (when the flanges 47 are resting on a shoulders 46) to fit fish of the smallest size that are to be operated upon.

The holes through the flanges 47, through which the studs 45 extend upwardly, are large enough to permit the hood 48 to be raised freely when a larger fish traverses the guiding support 14, and disposed to surround each of the studs is a helical compression spring 49 which extends from the flange 47 to engage with a thumb-nut 50 provided on the screw-threaded end portion of such stud 45 by which thumb-nut 50 the effective strength of the helical spring 49 may be regulated thus to regulate the pressure of the hood 48 upon fish of different sizes that traverse the guiding support 14, which pressure may counteract the upward pressure exerted against the inside of the fish by the operation of the circular brushes 32, 33 and 34 and the scrapers 36.

For a distance along the central portion of its length above a portion of the section 14 of the guiding support the hood 48 is enlarged to provide space within which to dispose a plurality of yieldingly mounted scrapers 51, as more clearly indicated in Fig. 5, which scrapers 51 are attached to screw-threaded studs 52 which are provided with thumb-nuts 53 and with helical springs 54 whereby the scrapers 51 may yield to move outwardly when they engage with the larger portions of a fish, and may move inwardly in response to the action of springs 54 to engage with smaller fish as such fish passes such enlarged central portion of the hood 48. The scrapers 51 by their disposition and operation serve in an obvious manner, to remove the scales from fish with which they engage.

Mounted on the top of the delivery end portion of the structure to be rotatable in bearings 55 is a driving shaft 56 which is provided with fast and loose pulleys 57 and 58, respectively, and on such shaft adjacent to the outer face of each of the oppositely disposed bearings 55 is a beveled gearwheel, as bevel gearwheels 59 and 60 (as more clearly shown in Fig. 2) of which gearwheels 59 and 60 each engages with a similar gearwheel, as gearwheels 61 and 62, which gearwheels are mounted on shafts 63 and 64, respectively, which are rotatably mounted in bearings 65 and 66, respectively, with each of which one of the bearings 55 is integral. The bearings 65 and 66 are disposed to extend obliquely upward with their axes parallel with the surfaces of the opposite sides of the sections 13, 14 and 15 of the fish guiding support, and upon the end portions of the shafts 63 and 64, which project from their respective bearings 65 and 66, are securely mounted sprocket wheels 67 and 68, respectively, as shown in Fig. 1, and at opposite ends of the structure are idler sprocket wheels 69 and 70 which are mounted on the upper ends of similarly and correspondingly disposed shafts 71 and 72, respectively.

Mounted on sprocket wheels 67 and 69 is a sprocket chain 73 and mounted on sprocket wheels 68 and 70 is a sprocket chain 74 which sprocket chains may be actuated to travel in response to revolutions of shafts 63 and 64, respectively. The outer portion of the sprocket chain 73, which extends between sprocket wheels 67 and 69, and the outer portion of sprocket chain 74 which extends between sprocket wheels 68 and 70 are supported and shielded by long sheet metal inclosing cases 75 and 76, respectively, which are mounted on supporting brackets 77 and 78, respectively, which are secured to the side rails 9 and 8, respectively, while the inner portions of said sprocket chains 73 and 74 are within the hood 48 to be guided in their travel by the sides of channels 79 and 80, respectively, which are formed in the opposite side walls of the hood 48 by longitudinal and outwardly projecting ridges 81 and 82, respectively, and in each of said channels 79 and 80 is a spring actuated bearing member 83 disposed to press against the back side of the sprocket chains 73 and 74 to force said sprocket chains in yielding engagement with a fish disposed on said guiding support.

Upon the inner side of equi-distantly disposed links of said sprocket chains 73 and 74 are inwardly projecting integral prongs 84, as more clearly indicated in Fig. 6, which are adapted to penetrate a fish as such fish enters the receiving end of the hood 48 to drag such fish over the several sections 15, 14 and 13 of the guiding support from the receiving to the delivery end of the structure in the direction indicated by the arrows in Fig. 3. Thus, successive fish may be disposed astride the outer end of the section 15 and move successively to enter the hood 48 there to be caught by the prongs 84 and dragged successively over the circular brush 34, then over the scrapers 35, then over the circular brushes 33 and 32 to emerge from the delivery end of the structure, the rotation of said brushes and scrapers by their contact with the inner side portions of such fish serving to remove undesirable matter from such portions; and in order simultaneously to wash such fish thoroughly I have provided a system of water pipes comprising a main supply pipe 85 which may be connected to a source of water supply, not shown, from which main supply pipe 85 extend nozzles 86 which are disposed respectively to throw a stream of water on the circular brushes 32, 33 and 34 and on the revolving scrapers 36; and connected with said supply pipe 85 is a branch pipe 87 which leads upwardly on the back side of the structure, thence forwardly to a point over the hood 48 at which point it connects with branches 88 and 89 which extend in opposite directions toward the front and back ends, respectively, of the structure to points adjacent to the respective opposite ends of the enlarged portion of the hood 48 at which points are connected pipes 90 and 91, respectively, which extend downwardly to connect with curved pipes 92 and 93, respectively, from which extend downwardly nozzles 94 which may guide streams of water into funnels 95 which will direct such stream of water on to the fish that are moving along on the fish guiding support in an obvious manner.

The operation of my invention when embodied in the structure hereinbefore described will be readily understood by those skilled in the art without further description. Of course, changes may be made in the forms, dimensions and arrangement of parts of my invention without departing from the spirit thereof.

What I claim is:

1. In a fish slimer of the class described, the combination with a supporting frame, of a fish-guiding support whose cross-section is of a form to resemble an inverted letter V; brackets disposed to secure said fish-guiding support to said supporting frame in a position above the plane of the top surfaces thereof; rotatably mounted fish-cleaning devices associated with said fish-guiding support; a cutter swingingly attached to the inner side of said fish-guiding support; mechanism associated with said cutter and said fish-guiding support for actuating said cutter to engage with a fish; yielding means for exerting a downward pressure on fish during their sliding movement on said fish-guiding support; two sprocket chains provided with prongs and each disposed to engage its prongs with fish disposed on said fish-guiding support; and means for communicating motion to said chains to cause them to drag fish with which they engage from one end to the other of said fish-guiding support.

2. A fish-slimer of the class described, which embodies a fish-guiding-support whose cross-section is of a form to resemble an inverted V and which is provided with a slot extending through its wall at its apex; a cutter pivotally secured beneath said fish-guiding-support and disposed to adapt it to be actuated to swing its cutting edge to project it upwardly through said slot; a connecting rod articulated with said cutter; a lever articulated with said connecting rod and pivotally attached to the inner side of a wall of said fish-guiding-support; a fish engaging member secured to said lever and disposed to project within the path of fish moving over said fish-guiding-support whereby said cutter may be actuated by its engagement with such fish as they pass said engaging member.

3. A fish-slimer of the class described, which embodies a longitudinally disposed fish-guiding-support whose cross-section is of a form resembling an inverted letter V; a hood formed in cross-section to adapt a portion of its inner side to engage with the surface of the back and sides of a fish, said hood being yieldingly disposed to straddle over said fish-guiding-support to adapt it to press downwardly on a headless disemboweled fish that may be disposed lengthwise astride of said fish-guiding-support, and said hood being enlarged in one portion of its length; and a plurality of scraper blades disposed within said enlarged portion of said hood in transverse planes parallel with each other and yieldingly attached to the walls of said enlarged portion to adapt them yieldingly to engage their edges with fish on said fish-guiding-support.

4. A fish-slimer of the class described, which embodies a longitudinally disposed fish-guiding-support whose cross-section is of a form resembling an inverted letter V and which is provided with an oblong opening disposed to extend through its apex portion; a rotatably mounted disk-like wheel which is provided with a plurality of equidistantly disposed recesses in its periphery and disposed beneath said fish-guiding-support with its periphery adjacent to the central portion of said oblong opening with its plane parallel with the side walls of said fish-guiding-support; scraper blades each pivotally disposed adjacent to one of the end walls of a different one of each of said recesses to project therefrom; and yielding means disposed within each of said recesses in a position to adapt it normally to maintain said scraper blade in engagement with said adjacent end wall.

In witness whereof, I hereunto subscribe my name this second day of April A. D., 1915.

CHARLES T. CARSON.

Witnesses:
O. JOHNSON,
A. HASKINS.

Copies of this patent may be obtained for five cents each, by addressing the "Commissioner of Patents, Washington, D. C."